(12) United States Patent
Yamada et al.

(10) Patent No.: US 9,028,225 B2
(45) Date of Patent: May 12, 2015

(54) MOTOR-DRIVEN COMPRESSOR

(75) Inventors: Tetsuya Yamada, Kariya (JP); Shinichi Okuyama, Kariya (JP); Yoshikazu Fukutani, Kariya (JP); Shingo Enami, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 721 days.

(21) Appl. No.: 13/074,713

(22) Filed: Mar. 29, 2011

(65) Prior Publication Data

US 2011/0243769 A1    Oct. 6, 2011

(30) Foreign Application Priority Data

Mar. 30, 2010    (JP) ................. 2010-079736

(51) Int. Cl.
| | |
|---|---|
| F04B 35/04 | (2006.01) |
| H01R 13/52 | (2006.01) |
| H01R 13/627 | (2006.01) |
| F04B 39/00 | (2006.01) |
| H02K 5/10 | (2006.01) |
| H02K 5/22 | (2006.01) |

(52) U.S. Cl.
CPC .............. *F04B 35/04* (2013.01); *H01R 13/521* (2013.01); *H01R 13/52* (2013.01); *H01R 13/627* (2013.01); *F04B 39/00* (2013.01); *H01R 13/5202* (2013.01); *H02K 5/10* (2013.01); *H02K 5/225* (2013.01); *Y10S 417/902* (2013.01)

(58) Field of Classification Search
CPC ......... F04B 35/04; F04B 39/00; H02K 5/225; H02K 5/10; H01R 13/5202
USPC ............ 417/410.1, 423.14, 902; 439/271–283
See application file for complete search history.

(56) References Cited

U.S. PATENT DOCUMENTS

| | | | |
|---|---|---|---|
| 3,396,908 A | | 8/1968 | Vind |
| 3,404,363 A | | 10/1968 | Fischer |
| 4,772,231 A | * | 9/1988 | Hayes ........................... 439/752 |

(Continued)

FOREIGN PATENT DOCUMENTS

| | | |
|---|---|---|
| GB | 2127628 | 4/1984 |
| JP | 05-321840 | 7/1993 |

(Continued)

OTHER PUBLICATIONS

European Patent Application No. 11159395: European Search Report dated Jul. 18, 2011, 8 pages.

*Primary Examiner* — Devon Kramer
*Assistant Examiner* — Joseph Herrmann
(74) *Attorney, Agent, or Firm* — Baker & Hostetler LLP

(57) ABSTRACT

A motor-driven compressor includes a connector to which a first and second conductors are connected, and a connector case receiving the connector. The connector case includes a first case member and a second case member. A seal member is provided between the first and second case members. The first case member has a first sealing surface extending along the periphery of the first case member. The second case member has a second sealing surface extending along the periphery of the second case member and facing the first sealing surface. The seal member includes a main seal portion for sealing between the first sealing surface and the second sealing surface. The main seal portion has a first peripheral seal portion for sealing the periphery of the first conductor inserted therethrough and has a second peripheral seal portion for sealing the periphery of the second conductor inserted therethrough.

9 Claims, 7 Drawing Sheets

(56) References Cited

U.S. PATENT DOCUMENTS

| | | | |
|---|---|---|---|
| 4,966,559 A * | 10/1990 | Wisner | 439/566 |
| 6,036,526 A | 3/2000 | Alfis, III | |
| 6,053,753 A | 4/2000 | Kunkle | |
| 7,285,725 B1 | 10/2007 | Saman | |
| 7,344,408 B2 * | 3/2008 | Kato et al. | 439/578 |
| 2002/0155741 A1 | 10/2002 | Herrick et al. | |
| 2004/0253124 A1 | 12/2004 | Ioi et al. | |
| 2005/0163630 A1 | 7/2005 | Hoshino et al. | |
| 2009/0304536 A1 | 12/2009 | Egawa et al. | |

FOREIGN PATENT DOCUMENTS

| | | |
|---|---|---|
| JP | 5-61474 | 8/1993 |
| JP | 05-256261 | 10/1993 |
| JP | 08/022870 | 1/1996 |
| JP | 2000-240572 | 9/2000 |
| JP | 2010-065625 | 3/2010 |
| WO | WO 2009/144231 | 12/2009 |

* cited by examiner

MOTOR-DRIVEN COMPRESSOR

CROSS REFERENCE TO RELATED APPLICATIONS

This application claims priority to Japanese Application No. 2010-079736 filed Mar. 30, 2010.

BACKGROUND

The present invention relates to a motor-driven compressor having a shell receiving therein an electric motor that is electrically connected to a power source located outside the shell.

In such kind of compressor, a first conductor connected to the power source extends through the shell, and a second conductor connected to the electric motor is connected to the first conductor in the shell.

Due to the stop of the compressor for a long time, refrigerant gas existing in the compressor or within the shell may be cooled and liquefied, and such liquefied refrigerant may remain in the compressor. Although the second conductor is covered by an insulator, immersion of the connection between the first and second conductors in the liquid refrigerant may cause electrical leakage between the first and second conductors.

In the compressor disclosed in Japanese Unexamined Patent Application Publication No. 5-256261, the second conductor or a motor lead wire is connected to a spring terminal, and part of the first conductor that is located in the shell is inserted in the spring terminal and electrically connected thereto. The spring terminal is covered by a heat-shrink tube in the shell. The tube shrinks when heated by operation of the compressor, thereby preventing contact between the conductors and liquid refrigerant in the shell.

However, sealing provided by the shrinkage of the tube may be insufficient and, therefore, electrical leakage in the shell may possibly occur. Good sealing may be accomplished, for example, by covering the spring terminal using heat-hardening resin such as epoxy resin and then setting the resin by heating. However, this procedure is troublesome.

The present invention is directed to providing a motor-driven compressor that provides improved and simple sealing of electrical connection between a first and a second conductors in a shell of the compressor.

SUMMARY

In accordance with an aspect of the present invention, a motor-driven compressor includes a shell, an electric motor provided in the shell, a connector provided in the shell, a first conductor electrically connected to the connector and extending through and out of the shell to be connected to a power source, a second conductor electrically connected to the connector and the electric motor, and a connector case receiving the connector. The connector case includes a first case member and a second case member. A seal member is provided between the first and second case members. The first case member has a first sealing surface extending along the periphery of the first case member. The second case member has a second sealing surface extending along the periphery of the second case member and facing the first sealing surface. The seal member includes a main seal portion for sealing between the first sealing surface and the second sealing surface. The main seal portion has a first peripheral seal portion for sealing the periphery of the first conductor inserted therethrough and has a second peripheral seal portion for sealing the periphery of the second conductor inserted therethrough.

Other aspects and advantages of the invention will become apparent from the following description, taken in conjunction with the accompanying drawings, illustrating by way of example the principles of the invention.

DETAILED DESCRIPTION OF ILLUSTRATIVE EMBODIMENTS

Figure 1:
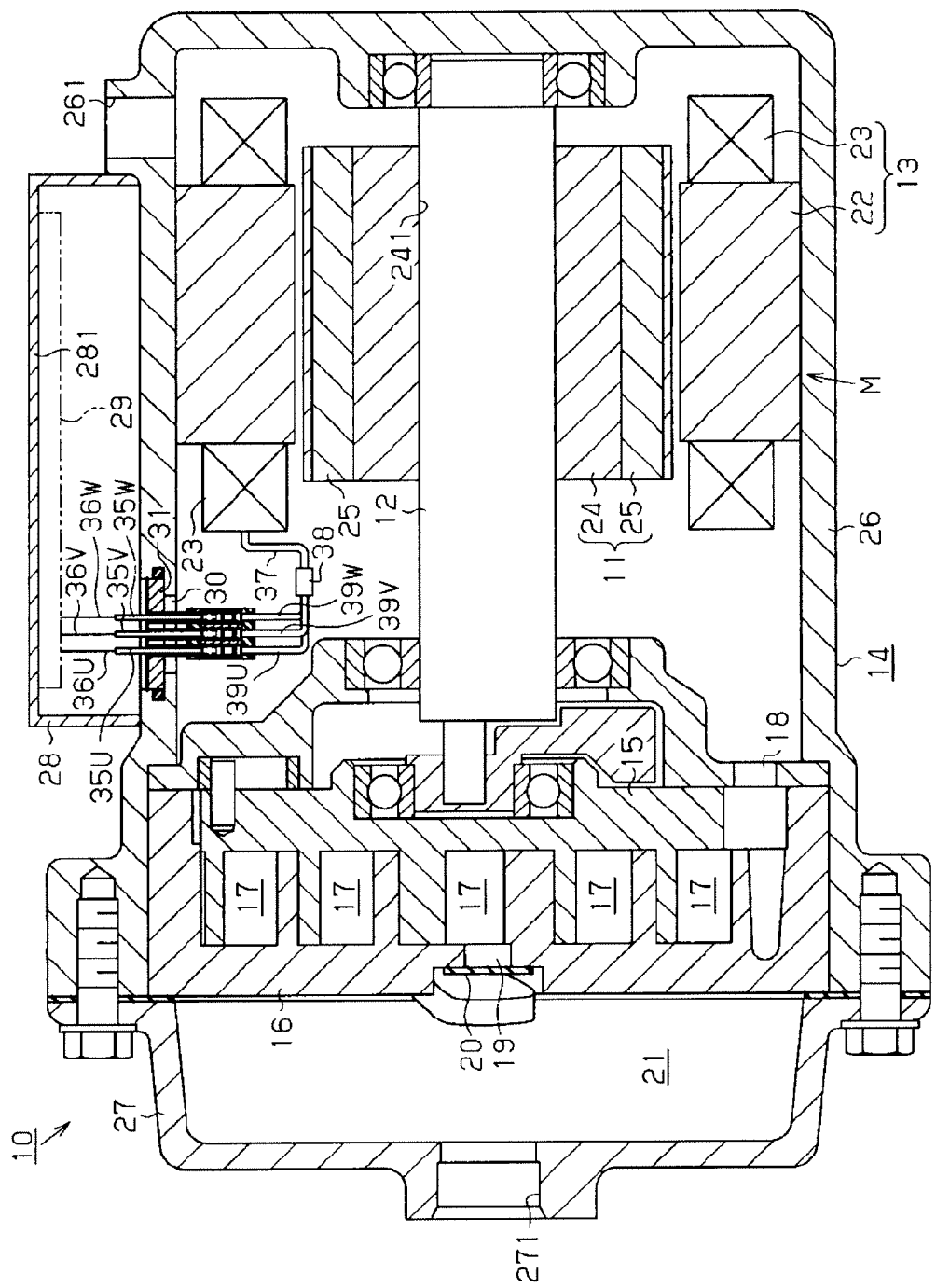
FIG. 1 is a longitudinal sectional view of a motor-driven compressor according to a first embodiment of the present invention.

The following will describe the first embodiment of the motor-driven compressor according to the present invention with reference to FIGS. 1 through 5. Referring to FIG. 1, the scroll-type motor-driven compressor designated generally by 10 has a generally cylindrical shell 14 in which an electric machine or an electric motor M is received. The shell 14 includes a motor housing 26 and a front housing 27 connected to the front end of the motor housing 26.

The electric motor M includes a rotary shaft 12, a rotor 11 fixed to the rotary shaft 12, and a stator 13 fixed on the inner peripheral surface of the motor housing 26. The compressor 10 has a movable scroll 15 and a fixed scroll 16 cooperating to form therebetween compression chambers 17. The movable scroll 15 is revolved by the rotation of the rotary shaft 12, so that the volumes of the compression chambers 17 are varied while the compression chambers 17 are moved from the periphery to the center of the fixed scroll 16.

The motor housing 26 has an inlet port 261 through which refrigerant gas is introduced from an external refrigerant circuit (not shown) into the motor housing 26. Refrigerant introduced into the motor housing 26 is flowed into the compression chamber 17 through a passage (not shown) between the inner peripheral surface of the motor housing 26 and the outer peripheral surface of the stator 13 and then a suction port 18, with the revolution of the movable scroll 15. The compressed refrigerant is discharged out from the central compression chamber 17 into a discharge chamber 21 formed in the front housing 27 through a discharge port 19 while pushing open a discharge valve 20, with the revolution of the movable scroll 15. The refrigerant flows out of the discharge chamber 21 through an outlet port 271 of the front housing 27 into the external refrigerant circuit, through which the refrigerant flows back into the motor housing 26.

The stator 13 of the electric motor M includes a ring shaped stator core 22 and a coil 23 wound around the stator core 22. The rotor 11 of the electric motor M includes a rotor core 24 and plural permanent magnets 25 embedded in the rotor core 24. The rotor core 24 is formed therethrough with a central hole 241 through which the rotary shaft 12 is inserted and fixed.

A cover 28 is provided on the outer peripheral surface of the motor housing 26. An inverter 29 as a power source is mounted on the inner surface of the upper wall 281 of the cover 28. Part of the motor housing 26 that is covered with the cover 28 is formed therethrough with a hole 30.

Figure 2:
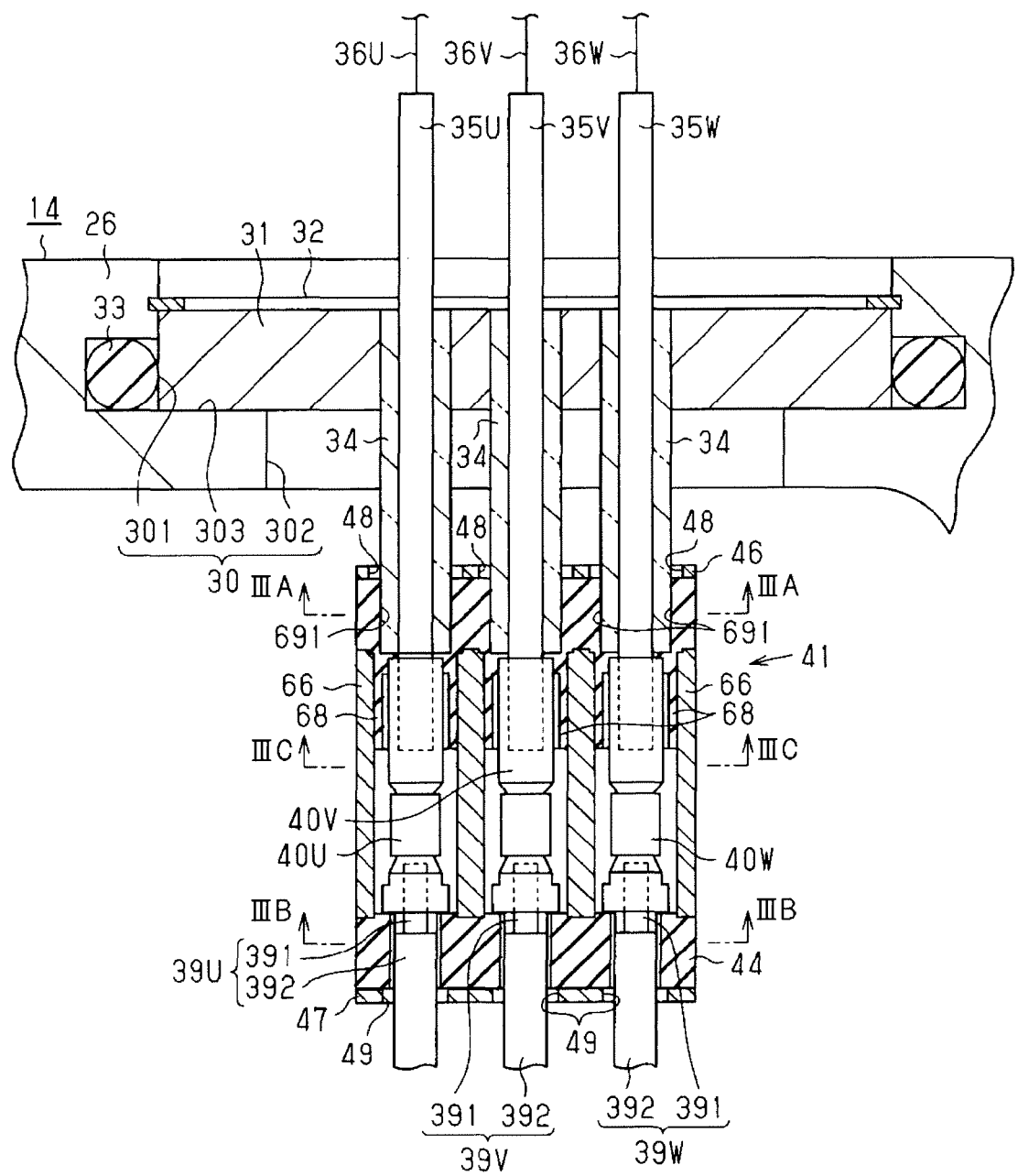
FIG. 2 is an enlarged fragmentary sectional view of the compressor of FIG. 1.

Referring to FIG. 2, the hole 30 has a large diameter portion 301 continuous with the outer peripheral surface of the motor housing 26, a small diameter portion 302 continuous with the inner peripheral surface of the motor housing 26, and a step 303 located between the large diameter portion 301 and the small diameter portion 302. A base 31 and a circlip 32 are provided in the large diameter portion 301. The base 31 is placed on the step 303 and prevented by the circlip 302 from being moved out of the large diameter portion 301. A seal ring 33 is provided between the outer periphery of the base 31 and the inner periphery of the large diameter portion 301 to prevent leakage of refrigerant along the outer periphery of the base 31.

Three tubular insulators 34 made of, for example, a glass are inserted through the base 31 and fixed thereto. Three conductive pins 35U, 35V, 35W as a first conductor are inserted through the respective insulators 34 and fixed thereto. One ends of the conductive pins 35U, 35V, 35W are projected from the insulators 34 out of the shell 14, and the other ends of the conductive pins 35U, 35V, 35W are projected from the insulators 34 radially inward of the shell 14. The ends of the conductive pins 35U, 35V, 35W outside the shell 14 are electrically connected to the inverter 29 (see FIG. 1) through electric wires 36U, 36V, 36W, respectively.

Referring back to FIG. 1, the coil 23 includes a U phase coil, a V phase coil and a W phase coil, each having a lead wire 37 (only one lead wire being shown in the drawing) electrically connected to a terminal 38 to which conductive members 39U, 39V, 39W as a second conductor are electrically connected.

As shown in FIG. 2, each of the conductive members 39U, 39V, 39W includes a core 391 and an insulator 392 covering the core 391. The cores 391 of the conductive members 39U, 39V, 39W are connected to connectors 40U, 40V, 40W to which the ends of the conductive pins 35U, 35V, 35W are connected. The connectors 40U, 40V, 40W are made of a metal. Thus, the cores 391 of the conductive members 39U, 39V, 39W are electrically connected through the connectors 40U, 40V, 40W to the ends of the conductive pins 35U, 35V, 35W, respectively. The connectors 40U, 40V, 40W are received in a connector case 41.

The conductive pin 35U, the conductive member 39U and the connector 40U serve as a U phase conductor. Similarly, the conductive pin 35V, the conductive member 39V and the connector 40V serve as a V phase conductor, and the conductive pin 35W, the conductive member 39W and the connector 40W serve as a W phase conductor. Electric power is supplied from the inverter 29 through the conductive pins 35U, 35V, 35W, the connectors 40U, 40V, 40W, and the conductive members 39U, 39V, 39W to the coil 23, so that the rotor 11 is rotated together with the rotary shaft 12.

Figure 3A:
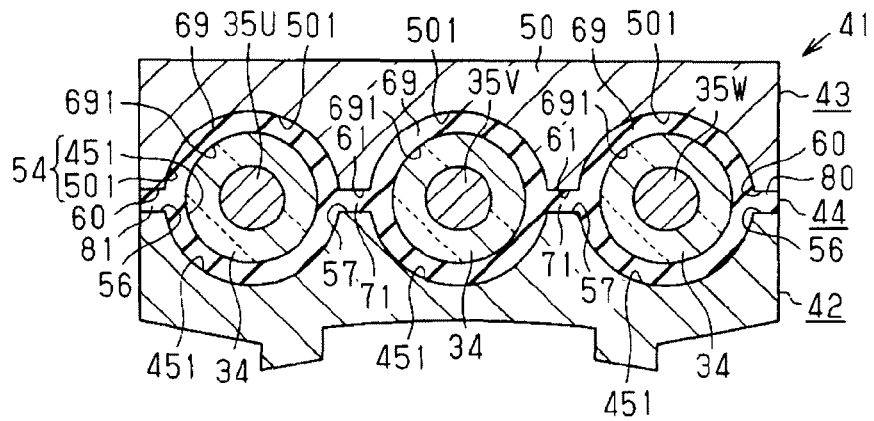
FIG. 3A is a cross-sectional view taken along the line IIIA-IIIA of FIG. 2.
Figure 3B:
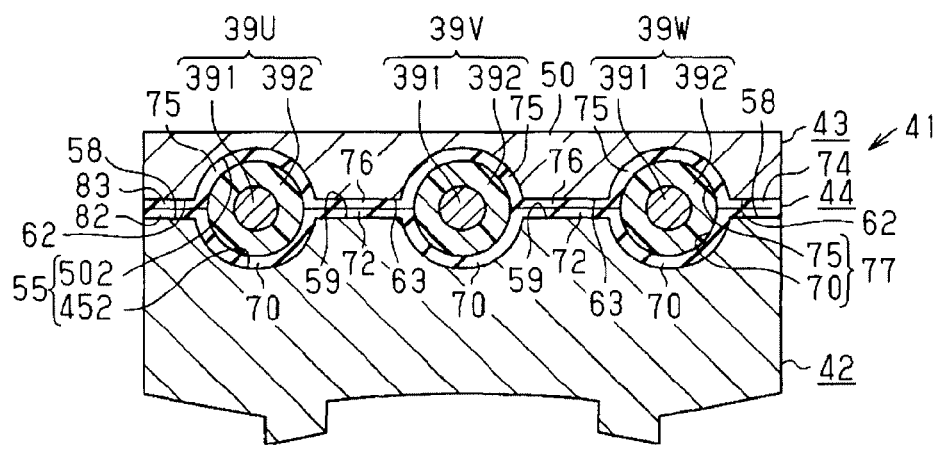
FIG. 3B is a cross-sectional view taken along the line IIIB-IIIB of FIG. 2.
Figure 3C:
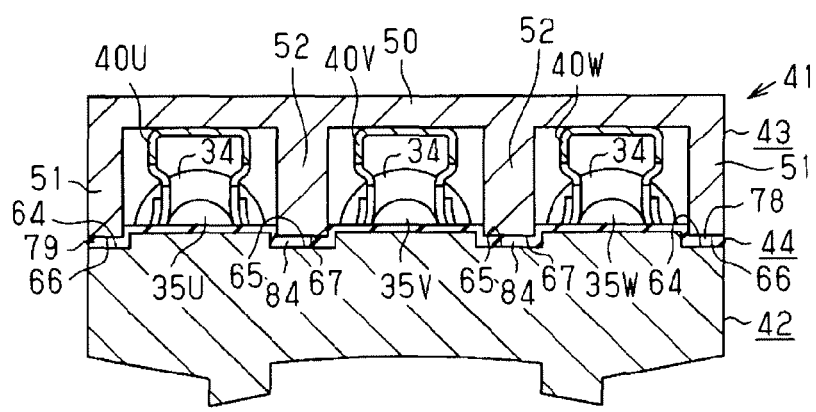
FIG. 3C is a cross-sectional view taken along the line IIIC-IIIC of FIG. 2.

Referring to FIGS. 3A, 3B and 3C, the connector case 41 includes a first case member 42 and a second case member 43 both of which are made of a resin. A seal member 44 made of a rubber is provided between the first and second case members 42, 43.

Figure 4:
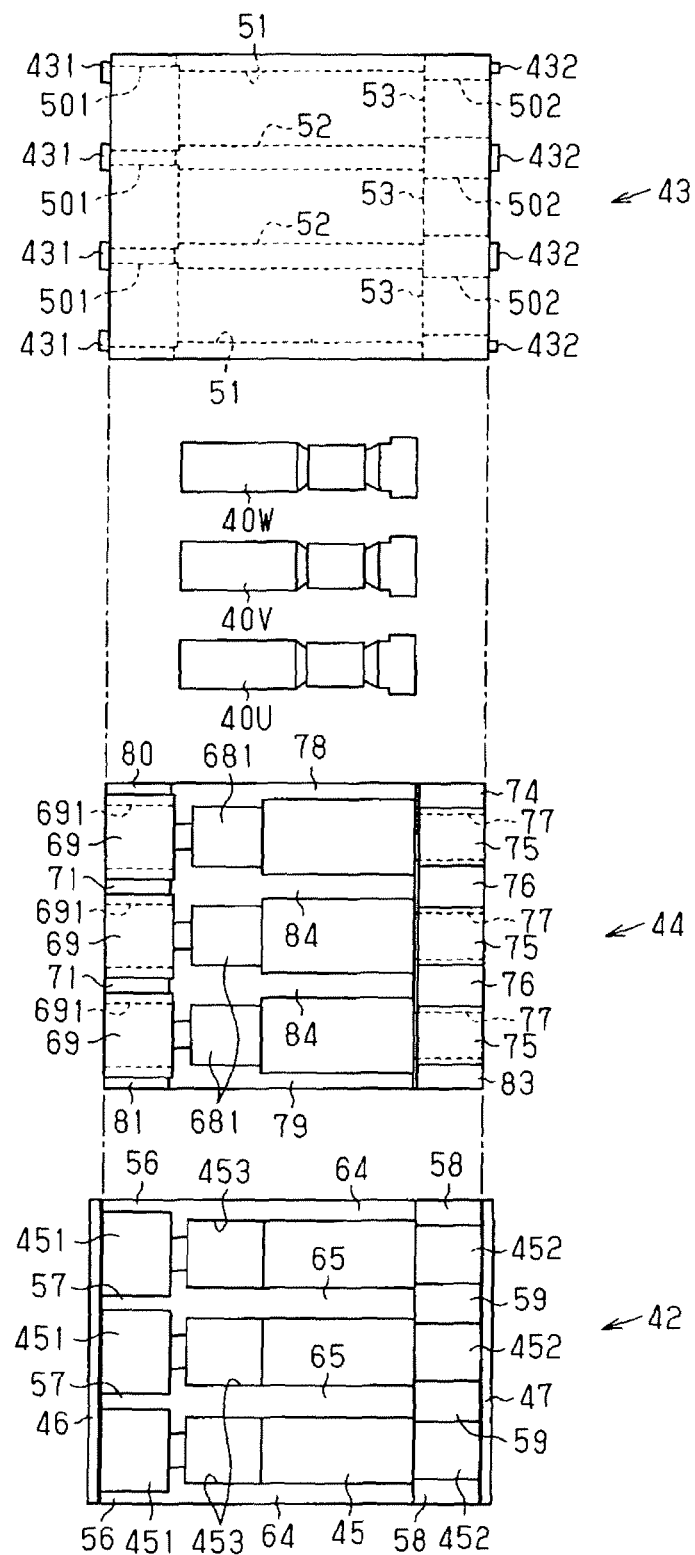
FIG. 4 is an exploded plan view of a connector case and its related components of the compressor, namely, a first case member, a second case member, a seal member and connectors.
Figure 5:
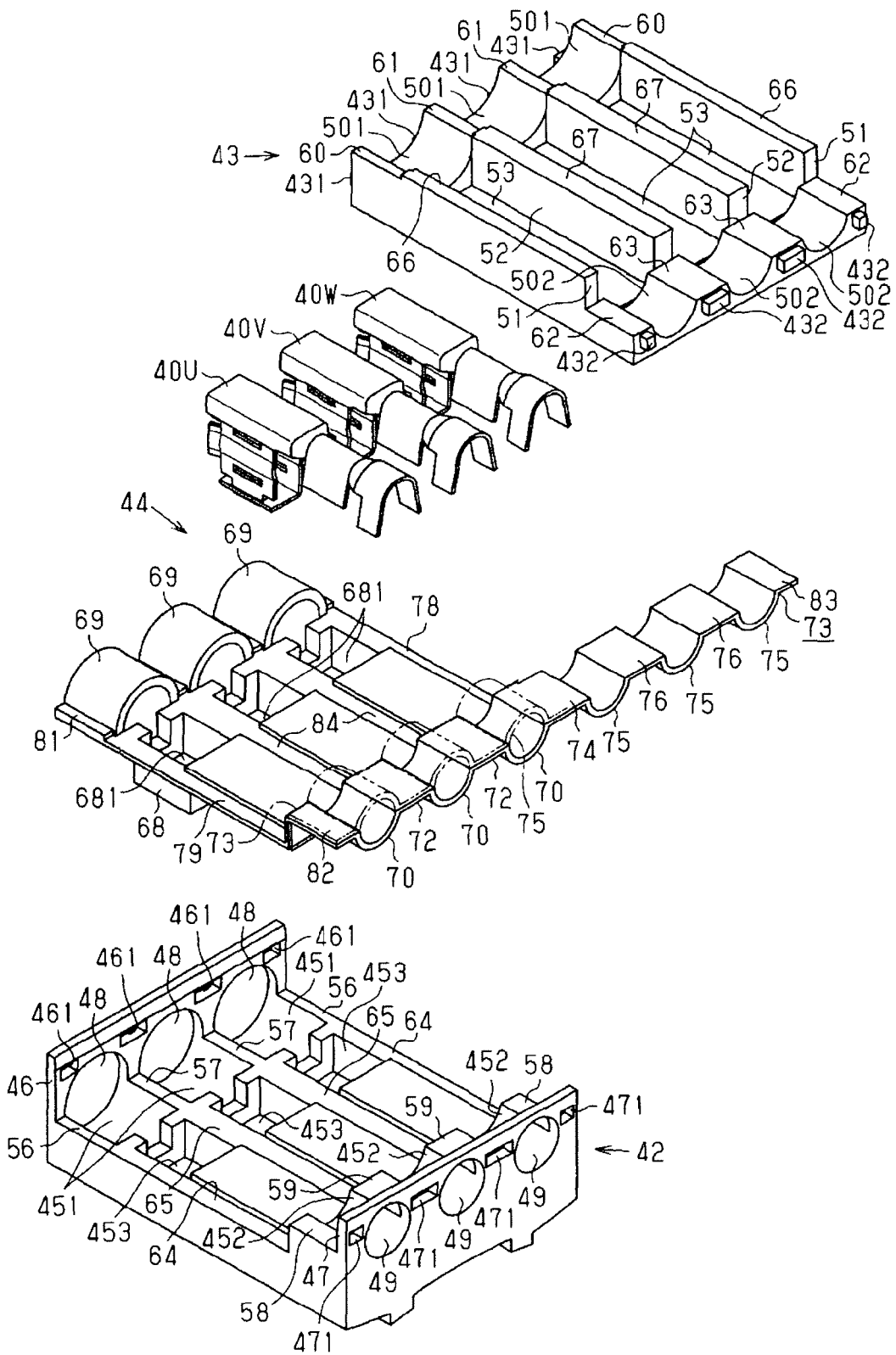
FIG. 5 is an exploded perspective view of the components of FIG. 4.

FIGS. 4 and 5 are exploded views of the connector case 41 and its related components. As shown in the drawings, the first case member 42 is of a generally rectangular shape and has on one short side thereof an end wall 46 and on the other short side thereof an end wall 47.

The end wall 46 is formed therethrough with three mounting holes 48 (first mounting hole), and the opposite end wall 47 is formed therethrough with three mounting holes 49 (second mounting hole) facing the respective mounting holes 48. The first case member 42 has on the one short side thereof three recesses 451 having a generally semi-cylindrical inner surface and being continuous with the respective mounting holes 48. The recesses 451 are bounded by a pair of outer sealing surfaces 56 and a pair of inner sealing surfaces 57. The first case member 42 has on the other short side thereof three recesses 452 having a generally semi-cylindrical inner surface and being continuous with the respective mounting holes 49. The recesses 452 are bounded by a pair of outer sealing surfaces 58 and a pair of inner sealing surfaces 59. The first case member 42 further has three recesses 453 that are connected to the respective recesses 451.

The first case member 42 has an outer sealing surface 64 between the outer sealing surfaces 56, 58 and an inner sealing surface 65 between the inner sealing surfaces 57, 59. The outer sealing surface 56 is continuous and flush with the outer sealing surface 64, and the inner sealing surface 57 is continuous and flush with the inner sealing surface 65. The outer sealing surface 58 is connected to the outer sealing surface 64 through a step, and the inner sealing surface 59 is connected to the inner sealing surface 65 through a step.

The second case member 43 is of a generally rectangular shape and has parallely extending paired outer side walls 51 and paired inner partition walls 52. The partition walls 52 are located between the side walls 51, so that three recesses 53 are formed between the side wall 51 and its adjacent partition wall 52 and also between the partition walls 52. The recesses 53 are configured to receive therein the connectors 40U, 40V, 40W.

The second case member 43 has on one short side thereof three recesses 501 having a generally semi-cylindrical inner surface and being continuous with the respective recesses 53. The recesses 501 are bounded by a pair of outer sealing surfaces 60 and a pair of inner sealing surfaces 61. The first case member 42 has on the other short side thereof three recesses 502 having a generally semi-cylindrical inner surface and being continuous with the respective recesses 53. The recesses 502 are bounded by a pair of outer sealing surfaces 62 and a pair of inner sealing surfaces 63.

The second case member 43 has an outer sealing surface 66 between the outer sealing surfaces 60, 62 and an inner sealing surface 67 between the inner sealing surfaces 61, 63. The outer sealing surface 60 is connected through a step to the outer sealing surface 66 at the end of the side wall 51, and the inner sealing surface 61 is connected through a step to the inner sealing surface 67 at the end of the partition wall 52. The outer sealing surface 62 is connected to the outer sealing surface 66 through a step, and the inner sealing surface 63 is connected to the inner sealing surface 67 through a step.

The end walls 46, 47 of the first case member 42 are formed therethrough with plural holes 461, 471, respectively. The second case member 43 is formed on the opposite short sides thereof with plural projections 431, 432. The second case member 43 can be held between the end walls 46, 47 of the first case member 42.

Engaging the projections 431, 432 of the second case member 43 with the holes 461, 471 of the first case member 42, respectively, the second case member 43 is held between the end walls 46, 47 of the first case member 42. The recess 451 of the first case member 42 cooperates with the opposite recess 501 of the second case member 43 to form a hole 54 therebetween (see FIG. 3A). Similarly, the recess 452 of the first case member 42 cooperates with the opposite recess 502 of the second case member 43 to form a hole 55 therebetween (see FIG. 3B).

The rubber seal member 44 has three mounting portions 68 to be inserted in the respective recesses 453 of the first case member 42. Each mounting portion 68 has a U-shaped cross section and a recess 681 for receiving a part of the connector 40U (40V, 40W). The seal member 44 has cylindrical portions 69 which are connected to the respective mounting portions 68. The seal member 44 has semi-cylindrical portions 70 on the side thereof opposite from the cylindrical portions 69.

As shown in FIG. 4, each cylindrical portion 69 has therein a space 691 that is connected to the recess 681 of the mounting portion 68. Any two adjacent cylindrical portions 69 are connected by seal portions 71. As shown in FIG. 5, any two adjacent semi-cylindrical portions 70 are connected by seal portions 72.

As shown in FIG. 5, a strip portion 73 is connected through a connecting portion 74 to the semi-cylindrical portion 70 that is located on one side of the seal member 44. The strip portion 73 has three semi-cylindrical portions 75 and any two adjacent semi-cylindrical portions 75 are connected by seal portions 76. The strip portion 73 is foldable at the connecting portion 74 so that the semi-cylindrical portions 75 of the strip portion 73 face their corresponding semi-cylindrical portions 70, as indicated by the double dashed line in the drawing. The opposite semi-cylindrical portions 70, 75 cooperate to form a hole 77 or a cylindrical portion where the conductive members 39U, 39V, 39W are inserted (see FIG. 3B).

As shown in FIG. 4, a side seal portion 78 (second side seal portion) is formed integrally with the mounting portion 68 at the lateral end thereof that is on one side of the seal member 44, and a side seal portion 79 (first side seal portion) is formed integrally with the mounting portion 68 at the lateral end thereof that is on the other side of the seal member 44. A seal portion 80 is formed integrally with the cylindrical portion 69 at the lateral end thereof that is on one side of the seal member 44, and a seal portion 81 is formed integrally with the cylindrical portion 69 at the lateral end thereof that is on the other side of the seal member 44. As shown in FIG. 5, the semi-cylindrical portion 70 on the other side of the seal member 44 is connected to the side seal portion 79 through a seal portion 82. As shown in FIG. 4, the connecting portion 74 is connected to the side seal portion 78. The adjacent mounting portions 68 are connected by inner seal portions 84.

As shown in FIG. 5, a seal portion 83 is formed integrally with the semi-cylindrical portion 75 that is on one side of the strip portion 73. The strip portion 73 is foldable at the connecting portion 74 so that the seal portions 76, 83 of the strip portion 73 are placed on their corresponding seal portions 72, 82, respectively. As shown in FIG. 3B, the seal member 44 is received in the connector case 41 with the strip portion 73 folded.

The following will describe a procedure for connecting the conductive pins 35U, 35V, 35W and the conductive members 39U, 39V, 39W through the connectors 40U, 40V, 40W in the connector case 41. It is noted that the insulators 34 holding the conductive pins 35U, 35V, 35W are previously fixed through the base 31 and that the first and second case members 42, 43 are yet to be assembled.

Firstly, the insulators 34 are inserted through the mounting holes 48 of the first case member 42 and then through the cylindrical portions 69 of the seal member 44 so that the ends of the conductive pins 35U, 35V, 35W are positioned in the recesses 681 of the seal member 44. The ends of the conductive pins 35U, 35V, 35W in the recesses 681 are connected to the connectors 40U, 40V, 40W. The conductive members 39U, 39V, 39W are inserted through the mounting holes 49 of the first case member 42 and connected at the cores 391 thereof to the connectors 40U, 40V, 40W.

Next, the strip portion 73 is folded at the connecting portion 74 so that the insulators 392 of the conductive members 39U, 39V, 39W are held between the semi-cylindrical portions 70, 75. With the cylindrical portions 69 fitted in the recesses 451 and the semi-cylindrical portions 70 fitted in the recesses 452, the second case member 43 is assembled to the first case member 42. By doing so, the connectors 40U, 40V, 40W connecting the conductive pins 35U, 35V, 35W and the conductive members 39U, 39V, 39W and the seal member 44 are received in the connector case 41.

With the connectors 40U, 40V, 40W received in the connector case 41, the cylindrical portions 69 of the seal member 44 are held between the recesses 451, 501, and the semi-cylindrical portions 70, 75 are held between the recesses 452, 502. The seal portions 80, 81 are held between the outer sealing surfaces 56, 60, and the seal portions 82, 83 and the connecting portion 74 are held between the outer sealing surfaces 58, 62. The side seal portions 78, 79 are held between the outer sealing surfaces 64, 66, and the inner seal portions 84 are held between the inner sealing surfaces 65, 67. The seal portions 71 are held between the inner sealing surfaces 57, 61, and the seal portions 76 are held between the inner sealing surfaces 59, 63.

Thus, the seal member 44 seals between the peripheries of the first and second case members 42, 43 while electrically insulating any two adjacent connectors 40U, 40V, 40W from each other by the inner seal portions 84.

The outer sealing surfaces 64, 56, 58, the recesses 451, 452, the inner sealing surfaces 57, 59 cooperate to form a first sealing surface extending along the periphery of the first case member 42. The outer sealing surfaces 66, 60, 62, the recesses 501, 502, the inner sealing surfaces 61, 63 cooperate to form a second sealing surface extending along the periphery of the second case member 43.

The cylindrical portions 69 and the seal portions 71, 80, 81 cooperate to form a first peripheral seal portion for sealing the peripheries of the conductive pins 35U, 35V, 35W inserted therethrough. The semi-cylindrical portions 70 and the seal portions 72 cooperate to form a base portion that is formed continuous with the side seal portions 78, 79, and such base portion and the strip portion 73 cooperate to form a second peripheral seal portion for sealing the peripheries of the conductive members 39U, 39V, 39W inserted therethrough. Such first and second peripheral seal portions and the side seal portions 78, 79 cooperate to form a main seal portion for sealing between the first and second sealing surfaces of the first and second case members 42, 43.

The motor-driven compressor 10 according to the first embodiment offers the following advantages.

(1) The seal member 44 sealing between the peripheries of the first and second case members 42, 43 prevents liquid refrigerant from entering the connector case 41. Sealing of the connector case 41 is accomplished simply by assembling the first and second case members 42, 43 to each other with the seal member 44 interposed therebetween. This provides improved and simple sealing of the electrical connections in the shell 14, specifically the connectors 40U, 40V, 40W between the conductive members 39U, 39V, 39W and the conductive pins 35U, 35V, 35W.

(2) Electrical contact between any two adjacent connectors 40U, 40V, 40W is blocked by the inner seal portions 84, which leads to improved electrical insulation between the connectors 40U, 40V, 40W, thereby preventing electrical leakage between the connectors 40U, 40V, 40W.

(3) The conductive members 39U, 39V, 39W are held between the strip portion 73 and the above-described base portion which are connected together through the connecting portion 74. This prevents liquid refrigerant from entering through the periphery of the conductive members 39U, 39V, 39W into the connector case 41. Further, with the strip portion 73 providing sealing between the connector case 41 and the conductive members 39U, 39V, 39W inserted therethrough, there is no need to provide additional holes for inserting the conductive members 39U, 39V, 39W into the seal member 44, which contributes to improved and simple sealing of electrical connections or the connectors 40U, 40V, 40W.

(4) The use of a rubber as the material for the seal member 44 allows an increased elastic deformation of the seal member 44, thereby making possible improved sealing between the first and second case members 42, 43.

The above embodiment may be modified in various ways as exemplified below.

Figure 6A:
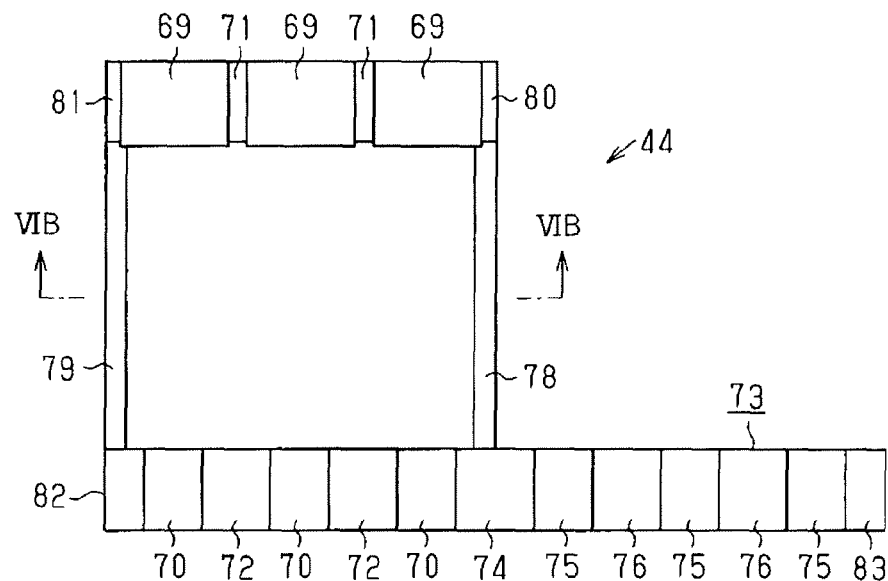
FIG. 6A is a plan view of another embodiment of the seal member.
Figure 6B:
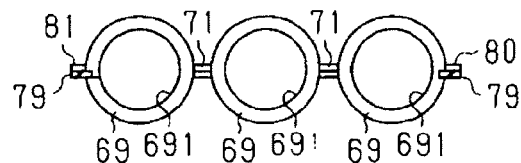
FIG. 6B is a cross-sectional view taken along the line VIB-VIB of FIG. 6A.

As shown in FIGS. 6A and 6B, the first embodiment may be modified so that the mounting portions 68 (see FIG. 5) and the inner seal portions 84 (see FIGS. 3C and 5) of the seal member 44 are removed. This modification also provides the advantages of the first embodiment.

Figure 7:
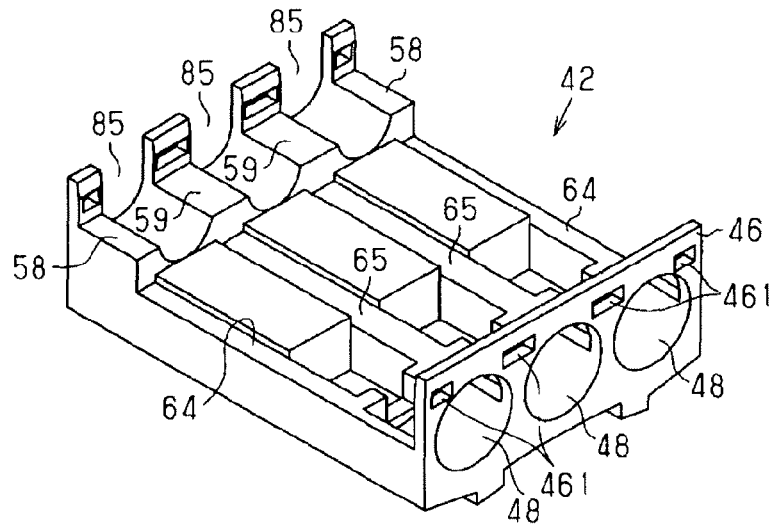
FIG. 7 is a perspective view of another embodiment of the first case member.

As shown in FIG. 7, the first embodiment may be modified so that the mounting holes 49 (see FIG. 5) are replaced by cutouts 85 extending to the edge of the end wall 47. This allows previous connection of the cores 39I of the conductive members 39U, 39V, 39W to the connectors 40U, 40V, 40W.

Figure 8:
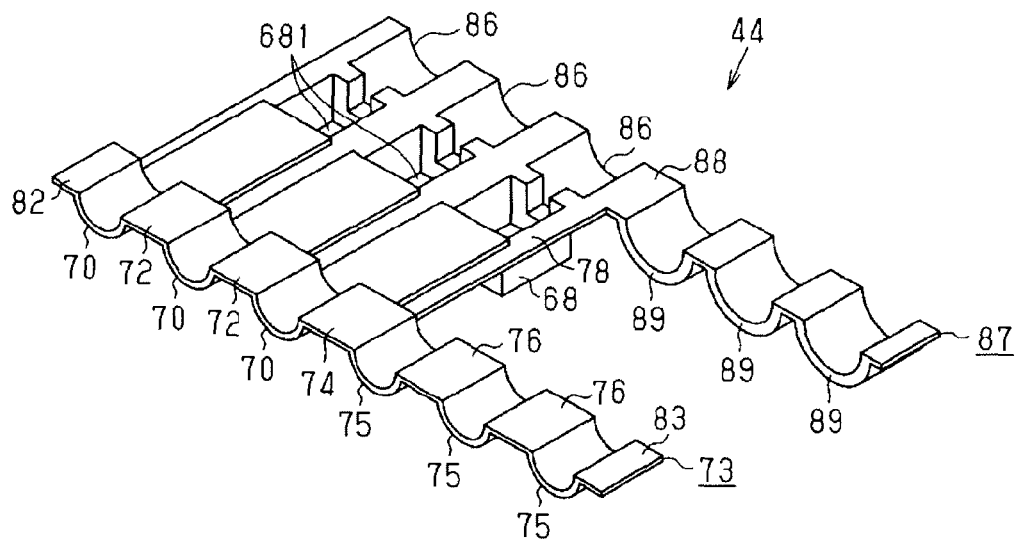
FIG. 8 is a perspective view of still another embodiment of the seal member.

FIG. 8 shows still another embodiment of the seal member. As shown in the drawing, the seal member 44 has three semi-cylindrical portions 86 which are connected to the respective mounting portions 68. A strip portion 87 is connected through a connecting portion 88 to the semi-cylindrical portion 86 that is located on one side of the seal member 44. The strip portion 87 has three semi-cylindrical portions 89. The strip portion 87 is foldable at the connecting portion 88 so that the semi-cylindrical portions 89 of the strip portion 87 face their corresponding semi-cylindrical portions 86. The opposite semi-cylindrical portions 86, 89 cooperate to form a cylindrical portion such as 69 of the first embodiment (see FIG. 5).

The semi-cylindrical portions 86 form a base portion that is formed continuous with the side seal portions 78, 79, and such base portion and the strip portion 87 cooperate to form a first peripheral seal portion for sealing the peripheries of the conductive pins 35U, 35V, 35W inserted therethrough.

Such modification allows no insertion of the tubular insulators 34 (see FIG. 2) into the seal member 44, which contributes to improved and simple sealing of electrical connections or the connectors 40U, 40V, 40W.

Figure 9A:
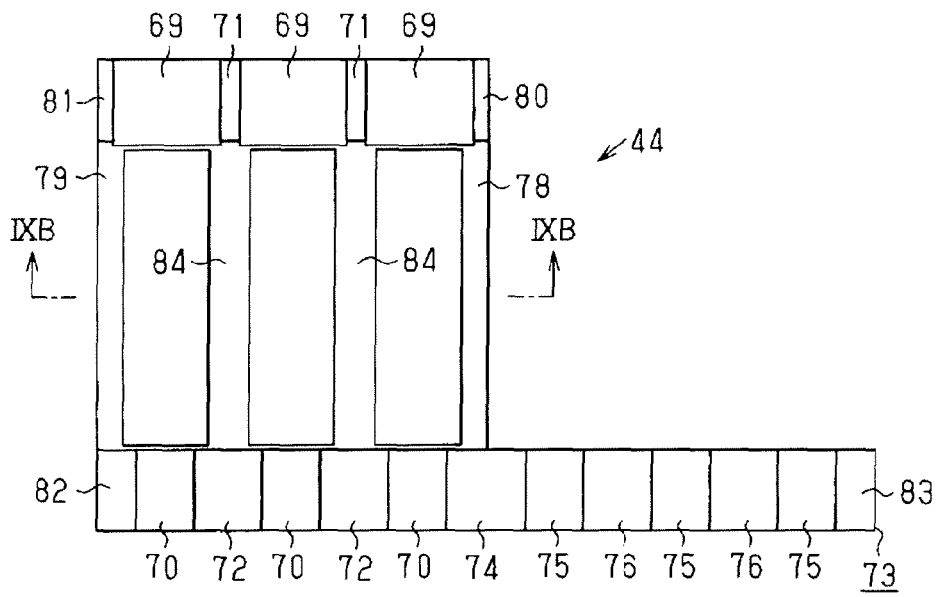
FIG. 9A is a plan view of further still another embodiment of the seal member.
Figure 9B:
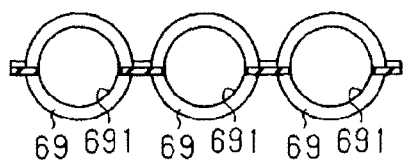
FIG. 9B is a cross-sectional view taken along the line IXB-IXB of FIG. 9A.

As shown in FIGS. 9A and 9B, the first embodiment may be modified so that the mounting portions 68 (see FIG. 5) are removed. The cylindrical portions 69 and the seal portions 71, 80, 81 are connected to the semi-cylindrical portions 70, 75, the seal portions 72, 76, 82, 83 and the connecting portion 74 through the side seal portions 78, 79 and the inner seal portions 84.

A flexible synthetic resin may be used as the material for the seal member 44.

What is claimed:

1. A motor-driven compressor, comprising:
a shell;
an electric motor provided in the shell;
a connector provided in the shell;
a first conductor electrically connected to the connector and extending through and out of the shell to be connected to a power source;
a second conductor electrically connected to the connector and the electric motor,
the first conductor, the connector, and the second conductor cooperate to form a phase conductor; and
a connector case receiving the connector,
wherein the connector case includes a first case member and a second case member, a seal member is provided between the first and second case members, the first case member has a first sealing surface extending along the periphery of the first case member, the second case member has a second sealing surface extending along the periphery of the second case member and facing the first sealing surface, the seal member includes a main seal portion for sealing between the first sealing surface and the second sealing surface, the main seal portion has a first peripheral seal portion for sealing the periphery of the first conductor inserted therethrough and has a second peripheral seal portion for sealing the periphery of the second conductor inserted therethrough,
wherein plural connectors, plural first conductors and plural second conductors are provided to form a plurality of the phase conductors, the seal member includes an inner seal portion for sealing between any two adjacent connectors with different phases, and the inner seal portion is connected to the first and second peripheral seal portions, and
wherein the first peripheral seal portion is disposed in contact with the first sealing surface of the first case member and the second sealing surface of the second case member, the second peripheral seal portion is disposed in contact with the first sealing surface of the first case member and the second sealing surface of the second case member.

2. The motor-driven compressor according to claim 1, wherein the first peripheral seal portion includes a cylindrical portion for each of the phase conductors through which the plural first conductors are inserted.

3. The motor-driven compressor according to claim 1, wherein the seal member includes plural recesses for receiving a part of the plural connectors.

4. The motor-driven compressor according to claim 1, wherein the main seal portion has a first side seal portion connecting one end of the first peripheral seal portion to one end of the second peripheral seal portion and has a second side seal portion connecting the other end of the first peripheral seal portion to the other end of the second peripheral seal portion, the second peripheral seal portion has a base portion formed continuous with the first and second side seal portions and has a strip portion connected to one end of the base portion through a connecting portion, the strip portion is folded at the connecting portion over the base portion so that the second conductor of each of the phase conductors is held between the base portion and the strip portion.

5. The motor-driven compressor according to claim 4, wherein the strip portion and the base portion each have a plurality of semi-cylindrical portions, the strip portion is folded over the base portion so that the semi-cylindrical portions of the strip portion faces the semi-cylindrical portions of the base portion, the opposite semi-cylindrical portions cooperate to form cylindrical portions through which the second conductor of each of the phase conductors is inserted.

6. The motor-driven compressor according to claim 1, wherein the main seal portion has a first side seal portion connecting one end of the first peripheral seal portion to one end of the second peripheral seal portion and has a second side seal portion connecting the other end of the first peripheral seal portion to the other end of the second peripheral seal portion, the first peripheral seal portion has a base portion formed continuous with the first and second side seal portions and has a strip portion connected to one end of the base portion through a connecting portion, the strip portion is folded at the connecting portion over the base portion so that the first conductor of each of the phase conductors is held between the base portion and the strip portion.

7. The motor-driven compressor according to claim 1, wherein the first case member has first mounting holes through which the first conductor of each of the phase conductors is respectively inserted and has second mounting holes through which the second conductor of each of the phase conductors is respectively inserted.

8. The motor-driven compressor according to claim 1, wherein the second case member has a recess for receiving the connector of each of the phase conductors.

9. The motor-driven compressor according to claim 1, the seal member is made of a rubber.

\* \* \* \* \*